Figure 1:
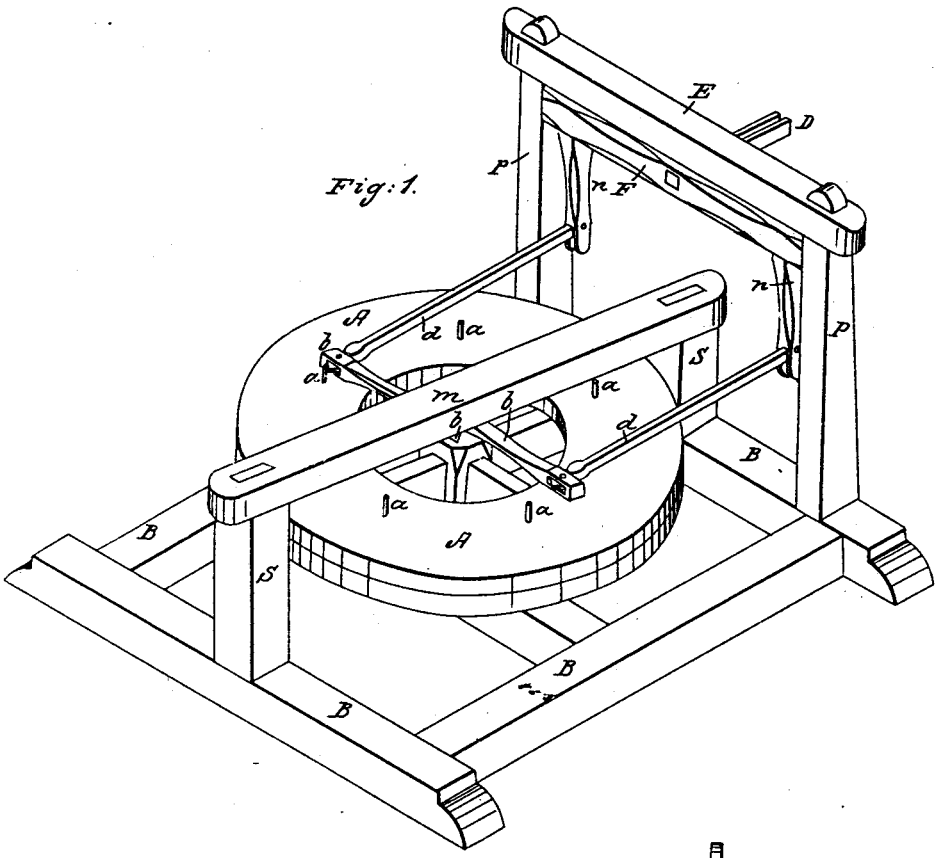
Figure 2:
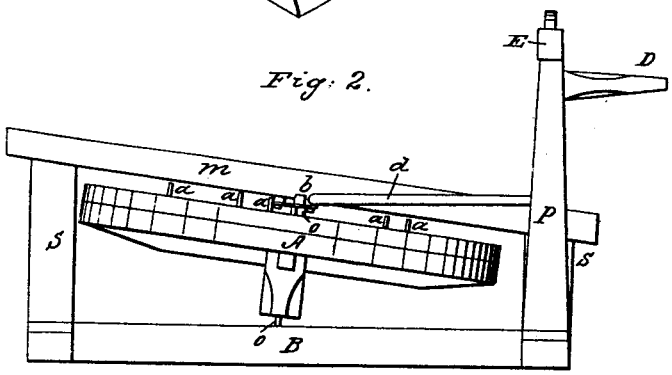

A. G. BRUSH.

Operating Churns.

No. 261. A. I. Patented Jan'y 10, 1860.

Witnesses:

Chas. F. Gilbert.

Wm. A. Snow.

Inventor:

Addison G. Brush.

N. PETERS, Photo-Lithographer, Washington, D. C.

DEPARTMENT OF COMMERCE
UNITED STATES PATENT AND TRADEMARK OFFICE

---

MISSING PAGE(S)

PATENT NUMBER AI 261 FOR THE ISSUE DATE 01/10/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims